United States Patent Office 2,927,097
Patented Mar. 1, 1960

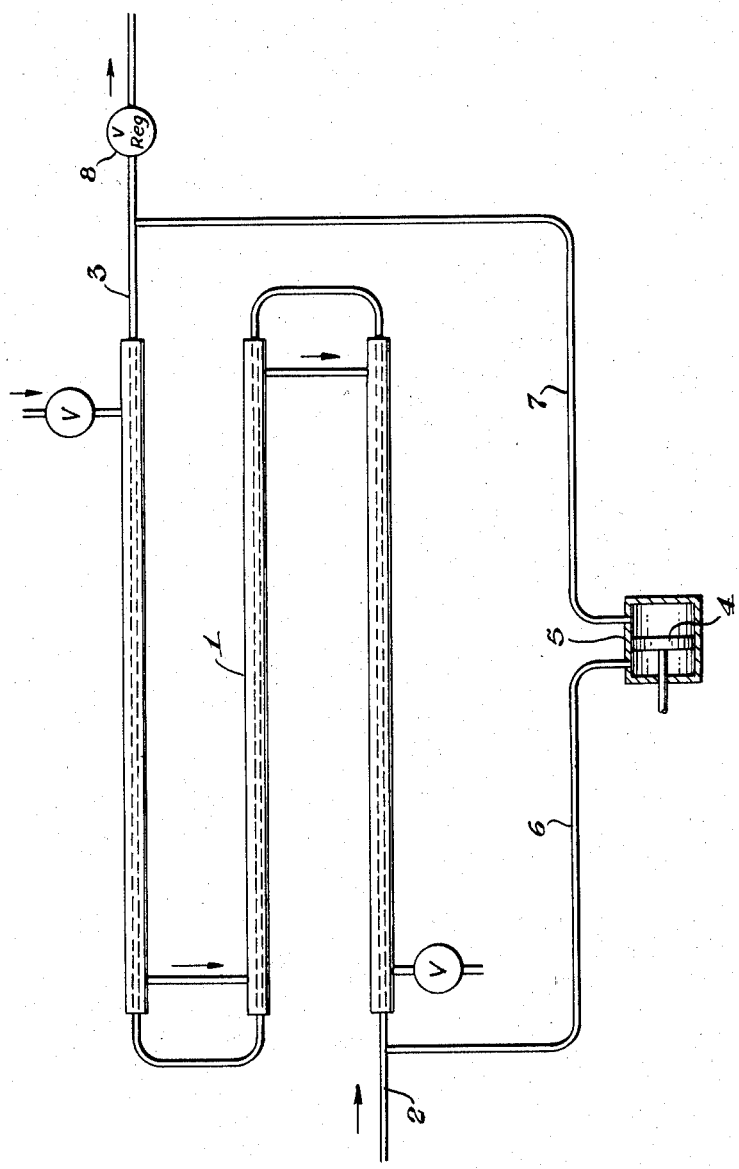

2,927,097

PROCESS FOR FORMING PHENOL-FORMALDEHYDE RESINOUS CONDENSATES IN CONTINUOUS TUBULAR REACTORS

Robert L. Von Berg, Ithaca, N.Y., and Noland I. Poffenberger, Midland, Mich., assignors to The Dow Chemical Company, Midland, Mich., a corporation of Delaware Application May 4, 1956, Serial No. 582,842

3 Claims. (Cl. 260—57)

This invention relates to a continuous process and apparatus for reacting materials in a liquid system, and more particularly refers to a new and improved tubular reactor and its use in processes where close control of temperature and reaction time is essential, or where suspended solids are present.

Tubular reactors are generally used in continuous processes. The reactants are continuously charged to the tubular passageway where the flowing stream is subjected to the desired temperature and pressure for sufficient length of time to effect the reaction. In any particular tubular reactor, the residence time in the reactor is determined by the rate of feed. For many processes, while it is advantageous to maintain turbulent flow in the reactor for purposes of heat transfer and mixing of reactants, the flow conditions in the reactor may be appreciably varied without difficulty by variation of the feed rate. In reactions where it is essential to closely control the temperature of the reaction, or where there are solids in suspension, it becomes necessary to maintain a highly turbulent flow in the reactor at all times to minimize the cross-sectional temperature gradient in the flowing stream or to keep the solids in suspension. In these reactions the freedom of variation of the feed rate to obtain the required residence time is limited. Maintaining a high velocity in the reactor by recycling part of the effluent to obtain the required residence time, will result in mixing the reaction products with the fresh feed which will decrease the rate of reaction. In chemical reactions, the rate of reaction is generally directly proportional to the concentration of the reactants and inversely proportional to the concentration of the products. Thus, the highest rate of reaction is obtained at the beginning of the reaction, decreasing as the reaction progresses since the concentration of the products increases. By recycling part of the effluent, the concentration of the products is initially increased so that the advantage of the high initial rate of reaction is not obtained. An ordinary tubular reactor may be designed for a particular process, by providing the necessary residence time and also a sufficiently high velocity in the reactor to produce the required turbulence. Normally, this would result in a small diameter tube reactor which would be extremely long and have an excessive pressure drop in the coil. Also, the operation of such reactor would be substantially inflexible. It would have to be operated at the designed feed rate at all times, as variation of the feed rate directly affects the velocity and reaction time of the reactants in the reactor. If the feed rate were to be appreciably increased above the design rate to decrease the residence time, the pressure drop would further increase. If the feed rate were to be decreased to increase residence time, turbulence would be reduced. If suspended solids are present or are formed in the flowing stream they would tend to settle out at reduced velocity and plug the tube. Also the temperature gradient in the stream would increase, resulting in having a higher temperature near the surface of the reactor than in the main stream. This temperature gradient may be considerable where reactants or products formed are viscous. If the reaction is sensitive to temperature, this may result in a much faster reaction rate or over-heating of the reactants near the surface of the tube.

In order to avoid or overcome the foregoing disadvantages and to permit of greater freedom in varying or adjusting reaction conditions, this invention provides means of imparting a reciprocatory or a pulsating motion to the stream flowing through the reactor. Thereby, turbulence to meet the needs of the particular reaction may be maintained independently of the feed rate by adjusting the magnitude and frequency of the pulsations. The residence time is determined only by the rate of feed and may be varied as needed without appreciably affecting the turbulence in the reactor. It thus becomes possible in continuous processes to carry out reactions requiring substantial time for completion in relatively short tubular reactors. Imparting a pulsating flow to a stream is a very efficient method of producing mixing. This is particularly true when there are materials distributed between two liquid phases of different densities. In unidirectional flow reactors, a much greater pressure drop must be used to obtain the equivalent turbulence. When the turbulence or mixing is due only to the velocity of the stream, the velocities in the reactor must be from 4 to 10 times greater than for pulsating flow. Thus, to obtain these higher velocities, the pressure drop required is approximately 12 to 60 times greater. In the pulsed reactor the reactants move progressively forward through the reactor mixing only with the constituents immediately preceding it. The concentration of the products in the reacting stream are low near the feed entry of the reactor and progressively increase as the constituents pass through the reactor. Thus, the initial high rate of reaction may be realized which would not be true if part of the effluent were recycled.

The principle of the invention may be more easily understood by reference to the accompanying drawing which illustrates diagrammatically one form of an apparatus in which the principle of the invention may be applied. A sectional steam jacketed tubular reactor 1 with a feed line 2 and a discharge line 3, is shown. Piston 4 is mounted to reciprocate within cylinder 5 of a double-acting reciprocating pump, which serves as a pulsating mechanism. Cylinder 5 is connected by pipe lines 6 and 7 with the reactor near the feed entry and discharge ends of the reactor, respectively. A back-pressure control valve 8 in line 3 is optional and may be used when reactions are to be carried out under a fixed pressure.

The particular apparatus with a sectional tubular reactor and a reciprocating pump as the pulsating mechanism was selected as it can more easily illustrate the principle of the invention than other possible arrangements. It is not necessary that a sectional steam jacketed tubular reactor be used. Any other type of elongated reactor of small cross sectional area, such as a coil, may be used. The means of supplying the heat is likewise immaterial. A heat medium may replace the steam, or the jacketing from the reactor may be removed and the heating accomplished by means of a temperature bath, electrical heating elements or direct fire. The piston pump, as a pulsating mechanism, can be replaced by any other mechanism or arrangement which will produce a direction-alternating flow or which will impart a reciprocatory motion to the reactants and products in the reactor. The desirable action may be obtained, as well, with a diaphragm pump, two synchronized pumps, or a centrifugal pump with a four-way valve or other valve alignment to quickly reverse the direction of flow.

In order to more easily understand the operation of the apparatus, the operation of the reactor under continuous feed without the use of the pulsating mechanism will be first discussed; secondly, the operation of the pulsating mechanism will be covered; and lastly, the combined effect of the continuous feed and the pulsation in the reactor will be shown. In this discussion reference will be made to "forward" and "backward" direction. By referring to "forward" direction will mean that the products and the reactants in the apparatus are flowing in the direction such that they are moving from the feed entry to the discharge end of the reactor. Backward direction will refer to movement in the opposite direction or from the discharge end to the feed entry.

In operating the reactor without pulsating mechanism, the desired reactants in the correct proportions are continuously fed through line 2 into reactor 1 which is heated to raise the reactants to the desired temperature. The reactants will progressively move forward through reactor 1 and be discharged through line 3. The residence time in the reactor will be the time the charged constituents are in the reactor which will be the length of time it takes for the constituents to flow through. This residence time is a function of the velocity of the stream in the reactor, which is determined by the rate of feed. If the feed rate is increased the velocity in the reactor will increase, but the residence time will decrease proportionally as the reactants will pass through the reactor faster. Thus, it is impossible to independently vary the velocity and the residence time.

In considering the action of pulsating mechanism on the fluids in the reactor when no feed is introduced, the direction-alternating flow or the reciprocating motion is imparted to the constituents by the reciprocatory movement of piston 4. The reactor 1, cylinder 5, and all of the lines 2, 3, 6, and 7 are full of fluid so that by moving piston 4 back and forth the fluid in the system is caused to flow in one direction a given distance and then reverse and flow in the opposite direction the same distance. The net effect is that the fluid is just moved back and forth a given distance within the system. The amplitude of the pulse in the reactor, e.g., the linear distance the liquids will move in one direction before reversing its flow, is dependent upon the volume displaced by piston 4 in cylinder 5 per cycle with respect to the internal diameter of the tube or tubes used in the tubular reactor. Thus, the amplitude is determined by the volumetric displacement of the pulsating mechanism per cycle and the tube diameter of the reactor. The velocity of the fluids flowing back and forth in the reactor is determined by the speed of piston 4, or the volumetric displacement of the pulsating mechanism per unit of time. It is possible to vary the velocity of the fluids by varying the volume displaced by the pulsating mechanism per unit of time. This may be done by varying the frequency of the pulsations, e.g., the number of cycles or number of times the fluids are made to flow in one direction and then reverse their direction in a given unit of time, or by keeping the frequency constant and increasing the amplitude of the pulsation. Thus with a pulsating mechanism any velocity or degree of turbulence may be obtained.

When the apparatus is operated according to the invention, the reactants are fed continuously to the apparatus while, and at the same time, the pulsating mechanism is imparting a reciprocatory motion to the reactants and products in the reactor. The combined effect is that the displacement of the constituents in the reactor is greater in the forward direction than in the backward direction producing a net forward flow through the reactor. Referring to the drawing, reactants in the proper proportions are continuously introduced at a uniform rate into reactor 1 through feed line 2 producing a forward flow, this forward flow being superimposed upon the pulsations opposes the pulsations during half of their cycle and supplements them during the other half. When piston 4 is moving to the right in cylinder 5, fluid will be drawn into the left hand side of cylinder. This will result in producing a displacement in line 6 equal to the amplitude of the pulsations in this line. With the feed being introduced continuously, the feed will enter through line 2 and move progressively in the forward direction in line 2 until the junction of line 2 and line 6 is reached. Here the feed will be mixed with the reciprocating constituents in the reactor and with these constituents will be drawn into line 6. When the piston 4 begins to move to the left, the constituents with the feed drawn into line 6 will be forced out of line 6 into the reactor. The feed being introduced into the system will move continuously forward in line 2 until the intersection of line 2 and line 6. Here the fresh feed will be joined by the constituents ejected from line 6. The combined fluids will move in the forwardly direction displacing a volume in the reactor equal to the volume of the feed entering during this half-cycle plus the displacement created by the pulsating mechanism. If P represents the volume displaced by the pulsating mechanism during the half-cycle and F the volume of the feed entering during the complete cycle, this forward volumetric displacement would be $(P+F/2)$. During the half-cycle, when piston 4 is moving to the right a volume of fluid, P, will be drawn into line 6. Since the feed will make up part of this volume, the displacement in the reactor in the backward direction will be equal to the volume drawn in by piston 4 less the volume of feed introduced during this half-cycle, or $(P-F/2)$. Thus, a particular particle of fluid in the reactor will be displaced in the forward direction by volume equal to $(P+F/2)$ and in the reverse direction by volume equal to $(P-F/2)$. The net volumetric displacement of the particle per cycle will be the difference between the forward and backward displacements, or $(P+F/2)-(P-F/2)$. This will be equal to F or the volumetric displacement caused by the feed introduced during the cycle. The net effect is that the movement of any particular particle in the reactor is in the forward direction and is equal to the displacement created by the introduction of the feed, which is the same as when no pulsating mechanism is used. Thus, the residence time of the constituents is determined by the rate of feed, and is not affected by the pulsations.

The velocity in the reactor will likewise be greater in the forward direction than in the backward direction. In the forward direction the velocity will be such that during the time of the half-cycle the volume moved forward will be equal to the volume of the feed plus the volume displaced by the pulsation or $(P+F/2)$. This will result in a velocity equal to the velocity created by the feed plus the velocity created by the pulsating mechanism. In the reverse direction the resulting velocity will be the difference of the velocity of feed and of the pulsation.

The products from the reactor will be discharged in a continuous flow. Since the system, the reactor and pulsating mechanism, is completely full of fluid at all time, the introduction of feed into the system will result in ejection of products from the reactor. By continuously introducing the feed into the reactor, products will be continuously discharged. Referring to the drawing, when piston 4 is moving to the left in cylinder 5, the volume displaced by the piston, P, will force an equal volume of fluid from line 6 into line 2. This fluid ejected from line 6 will combine with the incoming feed, F/2, and create a displacement in the reactor equal to $(P+F/2)$. This displacement will be transmitted into line 3. When piston 4 is moving to the left causing a displacement from line 6, an equal volume of fluid is drawn into the right hand side of cylinder 5 which results in a volume equal to P to be drawn into line 7 from line 3. Thus, this forward displacement equal to $(P+F/2)$ at the junction of line 3 and line 7 will be split. A volume equal to P will pass into line 7. A volume equal to F/2 will continue in line 3 and will result in ejections of products from the reactor pass valve 8. When piston 4 reaches the end of the left stroke and moves to the right, fluid will be ejected from line 7 into line 3. During this stroke the volume of the pulsation will be P in the backward direction. Since in line 6 volume P is also drawn in and since the incoming feed will make up part of this volume, a backward displacement in the reactor equal to (P−F/2) will be created. The displacement from line 7 into line line 3 will be equal to P, but upon being ejected into line 3, this displacement will be divided. (P−F/2) will create a backward displacement in the reactor while F/2 will pass into line 3 and cause a forward displacement discharging products from the reactor. The net result is that during the cycle the products will be continuously ejected.

This new and improved reactor is flexible in its operation and may be used where it is necessary to closely control the reacting conditions. Turbulence may be varied as required by controlling the amplitude and the frequency of the pulsating mechanism. The residence time is determined by the rate of feed, and may be adjusted as required. Thus, within this reactor with a well-pulsed flow, over-heating of the reactants near surfaces of the tube is prevented and the same reactor may be used for reactions requiring different residence times. In production of resinous condensate materials, where small changes in temperature and reaction time have a profound effect upon the reaction, is found a good example of the type of reactions where this reactor is particularly applicable.

In operation of the apparatus described, it is essential that the volume displaced by the pulsating mechanism in a given time be much greater than the volume of feed introduced within this time. The amplitude and frequency of the pulsations are usually adjusted to give a displacement about 3 to 10 times greater than the volume of feed. The relationship of amplitude and frequency of pulsation may be varied. Normally an amplitude of around 9 to 24 inches may be used, with a frequency of around 20 to several hundred cycles per minute. By operating under these conditions a highly turbulent state is obtained in the reactor. Since the turbulence is not only produced by the velocity of flow but also by the reversal of direction of flow, a relatively high frequency is desired. Thus, a high degree of turbulence can be maintained due to reversal of flow, even though at the point where the direction of the flow changes, momentarily the velocity is zero.

In use of this apparatus in manufacture of resinous materials it is often desirable to keep the reactants and products from entering the pulsating mechanism. This can be accomplished by filling the pulsating mechanism with inert liquid and making lines 6 and 7 of sufficient length so that the amplitude of the pulsation in these lines is less than their length. In addition to providing proper lengths, a means of continuous pumping a small amount of inert purge liquid into lines 6 and 7 near where these lines connect with the pulsating mechanism may be used. This will maintain the inert liquid in the pulsating mechanism at all times.

The following examples further illustrate the invention:

EXAMPLE I

A visual comparison of mixing by unidirectional flow and with pulsating flow was made.

A ⅜ inch inside diameter glass tube, 6 feet long, was used as a test section. To reduce the mixing at the entry and exit of the tube, the ends of the tube were gradually enlarged and attached to a tank, 26 inches high and 4 inches in diameter, at each end. A flow of a heterogeneous mixture of equal volume of water and monochlorobenzene through the test tube was maintained by pumping water into one tank at the top and pumping monochlorobenzene into the bottom of the tank at the same rate. Vents were provided to vent any air that was entrapped in the liquids. The phases of the mixture were made more distinct by tinting the monochlorobenzene with a red oil dye and the water with sodium fluorescein. The color of the stream changed from the clear colors of red and green to an opaque milky-pink when mixing occurred.

In unidirectional flow without a pulsating velocity being superimposed, a velocity of 16 feet per second was required to obtain good mixing.

To obtain a pulsating velocity, a double acting piston pump similar to the one shown diagrammatically in the attached drawing was used. One end of the pump cylinder was made to communicate with the bottom of one tank of the test equipment and the other end to communicate with the second tank. The pump was driven by a crankshaft and was such size that the amplitude of the pulse was 10.8 inches in the test tube. Thus, in one complete revolution of the crankshaft, the liquid in the tube moved 10.8 inches in one direction and then back 10.8 inches or the total distance of 21.6 inches. The average pulse velocity was varied by varying the speed of the pump and can be expressed in terms of the number of rotations of the crankshaft per minute, r.p.m., as follows:

$$\frac{21.6}{12} \times \frac{\text{r.p.m.}}{60} = .03 \text{ r.p.m., feet per second}$$

A series of tests were made with pulsating flow. In the first test no net flow of the mixture through the tube was used so that the mixture was just moved back and forth. In other tests, a constant flow of the mixture was established in the tube and then the pulsating velocity was superimposed upon this unidirectional flow, the pulse velocity was increased by increasing the speed of the pump and it was noted when mixing began and when complete mixing was obtained in the tube.

The results obtained are shown in Table I.

*Table I*

| Net Flow in Tube, Ft./Sec. | Calculated Pulse Velocity, Ft./Sec. | |
|---|---|---|
| | Mixing Started | Complete Mixing |
| 0 | 1.5 | 3.0 |
| 1.45 | 2.7 | 3.6 |
| 2.9 | 3.0 | 3.8 |
| 4.35 | 3.0 | 3.8 |
| 5.8 | 3.0 | 3.9 |

Thus, when the feed rate through the glass tube was relatively low, mixing, in which the one of the two phases were broken into fine droplets and converted into what visually appeared to be a uniform mixture, could be obtained with pulse velocities of 3 to 4 feet per second.

EXAMPLE II

A study was made to determine the effect of pulsating velocities on the coefficient of heat transfer.

An apparatus essentially as shown in the diagram was used. A jacketed copper tube, 0.75 inch inside diameter and 0.045 inch wall thickness, having a heating length of 56 inches was heated with 5 p.s.i.g steam. Water was passed through the tube at different rates and the coefficient of heat transfer determined by noting the temperature rise in the water and the amount of steam condensed. Pulse velocities of different magnitude were superimposed upon the water rates and the heat coefficient of heat transfer again determined. The amplitude of the pulse was 14 inches and the average pulse velocity was determined in Example I. The results obtained are shown in Table II.

Table II

[Overall heat transfer coefficient, B.t.u./(hr.) (sq. ft.) (° F.).]

| Net Flow of Water, Ft./Sec. | Calculated Pulse Velocities, Ft./Sec. | | | | | | | |
|---|---|---|---|---|---|---|---|---|
| | 0 | 1.71 | 1.95 | 2.4 | 2.8 | 3.28 | 3.85 | 4.85 |
| 0.51 | 415 | 615 | 672 | 734 | | | | |
| 0.67 | 440 | 804 | 887 | 959 | 1,009 | 1,089 | | |
| 0.82 | 465 | 751 | 831 | 933 | 1,053 | 1,111 | 1,149 | |
| 1.33 | 550 | 701 | 772 | 848 | 986 | 1,056 | 1,150 | 1,198 |
| 2.37 | 710 | 803 | 844 | 935 | 1,028 | | 1,240 | 1,440 |
| 2.53 | 733 | 752 | 815 | 875 | 972 | 1,094 | 1,198 | 1,318 |
| 3.56 | 900 | | | | | 957 | | 1,180 |
| 4.27 | 1,020 | | | | | 1,038 | 1,092 | 1,240 |

EXAMPLE III

A tubular reactor consisting of 10 8-foot sections of steam jacketed ¼" stainless steel pipe and 2 8-foot sections of steam jacketed 1" stainless steel pipe was operated as a continuous reactor for reacting an aqueous mixture of phenol and formaldehyde to form condensation products. The mixture contained 0.8 mole of formaldehyde per mole of phenol and oxalic acid was used as catalyst. The reactor was heated by high pressure steam at 240 p.s.i.g. in the steam jackets of all of the sections of the reactor. The reactor was operated at a system pressure of about 30 p.s.i.g., the average temperature of the reactants at 195° C., and a residence time of 10 minutes. This system operated for 9 hours and then the reactor became plugged. Upon disassembling the reactor it was found that all of the sections were completely filled with a white granular solid.

Another run was made with the reactor under conditions similar to above but a large single-acting duplex piston pump was used to impart reciprocatory motion to the reactants. The pump with the check valves removed, was arranged so that one cylinder of the pump was connected by means of a pipe to the feed entry end of the reactor while the other cylinder was interconnected with the discharge end of the reactor. The pump was operated imparting a back and forth movement to the reactants amounting to a 24 inch movement in the ¼" sections of the reactor at a frequency of 40 times a minute. This run with the pulsator operated for 25½ hours. Upon disassembly of the reactor it was found that at the ends of 1" pipe sections of the reactor a granular solid had been deposited restricting the flow. The ¼" pipe sections of the reactor were relatively free of any deposit. This indicated that the reciprocatory motion of the reactor in the 1" pipe was not sufficient.

A further run was made similar to Example II except that the two 1" pipe sections were removed and the feed rate of the reactants changed to give the same residence time. The reactor operated for 48 hours without any indication of plugging when it was shut down for inspection. Upon disassembly, it was found that only the tube walls were coated with a hard thin film.

What is claimed is:

1. In reacting phenol and formaldehyde to produce a thermoplastic resinous condensate product, wherein the reactants in liquid phase are continuously fed as a stream into a tubular passageway, therein subjected to the temperature and pressure required for the reaction, and discharged from the opposite end, the method of maintaining uniform temperature and heat transfer in such stream which comprises continuously applying a reciprocatory motion thereto of an amplitude and frequency to obtain a volume displacement of from 3 to 10 times the volume of the reactants fed within this time, with the volume displaced by each reciprocatory motion being substantially smaller than the total volume of said tubular passageway, thereby obtaining a turbulent flow in the tubular passageway.

2. In reacting phenol and formaldehyde to produce a thermoplastic resinous condensate product, wherein the reactants in liquid phase are continuously fed as a stream into a tubular passageway, therein subjected to the temperature and pressure required from the reaction, and discharged from the opposite end, the method of maintaining uniform temperature and heat transfer in such stream which comprises applying a reciprocatory motion thereto of an amplitude in the range of 9 to 24 inches and a frequency in the range of 20 to 60 cycles per minute, with the volume displaced by each reciprocatory motion being substantially smaller than the total volume of the tubular passageway, thereby obtaining turbulent flow in the tubular passageway.

3. In reacting phenol and formaldehyde to produce a thermoplastic resinous condensate product, wherein the formaldehyde and phenol are intermixed in a molar ratio of 0.8 mole of formaldehyde per mole of phenol and in liquid phase are continuously fed as a stream into a tubular passageway, therein subjected to an average temperature of 195° C. and a pressure of about 30 pounds per square inch gauge, and discharged from the opposite end, the method of maintaining uniform temperature and heat transfer in such stream which comprises applying a reciprocatory motion thereto of an amplitude in the range of 9 to 24 inches and a frequency in the range of 20 to 60 cycles per minute, with the volume displaced by each reciprocatory motion being substantially smaller than the total volume of the tubular passageway, thereby obtaining turbulent flow in the tubular passageway.

References Cited in the file of this patent

UNITED STATES PATENTS

| | | |
|---|---|---|
| 1,660,403 | Turkington | Feb. 28, 1928 |
| 1,708,782 | Beale et al. | Apr. 9, 1929 |
| 2,456,192 | Houlton | Dec. 14, 1948 |
| 2,460,546 | Stephanoff | Feb. 1, 1949 |